(12) United States Patent
Mori et al.

(10) Patent No.: US 10,774,754 B2
(45) Date of Patent: Sep. 15, 2020

(54) ENGINE

(71) Applicant: HONDA MOTOR CO., LTD., Minato-Ku, Tokyo (JP)

(72) Inventors: Kensuke Mori, Wako (JP); Masahiro Kontani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/561,961

(22) Filed: Sep. 5, 2019

(65) Prior Publication Data

US 2020/0080498 A1 Mar. 12, 2020

(30) Foreign Application Priority Data

Sep. 7, 2018 (JP) ................................. 2018-167745

(51) Int. Cl.
*F02D 9/10* (2006.01)
*F02M 35/10* (2006.01)
(Continued)

(52) U.S. Cl.
CPC ............. *F02D 9/107* (2013.01); *F01M 13/04* (2013.01); *F02B 61/02* (2013.01); *F02D 9/1005* (2013.01); *F02D 9/1035* (2013.01); *F02D 11/10* (2013.01); *F02F 7/0007* (2013.01); *F02F 7/0021* (2013.01); *F02M 25/06* (2013.01); *F02M 35/10078* (2013.01); *F02M 35/10085* (2013.01);
(Continued)

(58) Field of Classification Search
CPC . F02D 9/1035; F02D 9/107; F02M 35/10078; F02M 35/10085
See application file for complete search history.

(56) References Cited

U.S. PATENT DOCUMENTS 5,704,334 A * 1/1998 Kato ..................... F02B 61/045
123/195 A
5,957,108 A * 9/1999 Kato ..................... F02B 61/045
123/195 A (Continued)

FOREIGN PATENT DOCUMENTS

JP 2011-149277 A 8/2011
JP 2014-159775 A 9/2014
(Continued)

OTHER PUBLICATIONS

Official Communication issued in the corresponding Japanese Patent Application No. 2018-167745.

*Primary Examiner* — Kevin R Steckbauer
(74) *Attorney, Agent, or Firm* — Carrier Blackman & Associates, P.C.; Joseph P. Carrier; William D. Blackman (57) ABSTRACT

An engine includes: a throttle body that is joined to an intake port and that makes a butterfly valve within an intake path actuate based on driving force of an electric actuator so as to adjust an opening degree of the intake path; a receptor that extends from the throttle body to a direction distant from the throttle body above a crankcase and that receives the electric actuator therein; and a supporting piece that extends from the receptor to the direction distant from the throttle body and that is supported on the crankcase. Accordingly, in the engine, it is possible to alleviate the influence of vehicle vibrations on the throttle body and actuator by enhancing the rigidity with which to support the throttle body and actuator in a simple structure.

6 Claims, 7 Drawing Sheets

(51) Int. Cl.
*F02D 11/10* (2006.01)
*F02M 35/16* (2006.01)
*F01M 13/04* (2006.01)
*F02B 61/02* (2006.01)
*F02F 7/00* (2006.01)
*F02M 25/06* (2016.01)

(52) U.S. Cl.
CPC .... *F02M 35/10321* (2013.01); *F02M 35/162* (2013.01); *F01M 2013/0461* (2013.01); *F02D 2011/102* (2013.01)

(56) References Cited

U.S. PATENT DOCUMENTS

| | | | | |
|---|---|---|---|---|
| 6,427,655 | B2 * | 8/2002 | Itoh | F02B 61/045 |
| | | | | 123/184.42 |
| 7,028,669 | B2 * | 4/2006 | Nagashii | F01N 3/2853 |
| | | | | 123/470 |
| 7,503,292 | B2 * | 3/2009 | Holmdahl | F02B 25/22 |
| | | | | 123/336 |
| 7,533,653 | B2 * | 5/2009 | Hotta | F02D 9/1095 |
| | | | | 123/336 |
| 7,681,551 | B2 * | 3/2010 | Konno | F02M 35/10085 |
| | | | | 123/400 |
| 8,047,180 | B2 * | 11/2011 | Sato | F02D 9/1095 |
| | | | | 123/336 |
| 10,648,432 | B2 * | 5/2020 | Berner | F02M 35/10386 |
| 2001/0052332 | A1 * | 12/2001 | Itoh | F02B 75/20 |
| | | | | 123/184.42 |
| 2004/0216721 | A1 * | 11/2004 | Nagashii | F02M 35/10026 |
| | | | | 123/470 |
| 2005/0045147 | A1 * | 3/2005 | Ishikawa | F02M 35/10039 |
| | | | | 123/336 |
| 2007/0221169 | A1 * | 9/2007 | Konno | F02M 35/10255 |
| | | | | 123/400 |
| 2008/0029055 | A1 * | 2/2008 | Hotta | F02D 9/1095 |
| | | | | 123/184.35 |
| 2009/0241900 | A1 * | 10/2009 | Sato | F02M 35/162 |
| | | | | 123/438 |
| 2018/0209385 | A1 * | 7/2018 | Berner | F02M 35/10386 |
| 2020/0032697 | A1 * | 1/2020 | Mori | F01P 3/02 |
| 2020/0063620 | A1 * | 2/2020 | Kontani | F02M 35/02 |
| 2020/0063654 | A1 * | 2/2020 | Kontani | F02M 9/08 |

FOREIGN PATENT DOCUMENTS

| | | |
|---|---|---|
| JP | 2014-167295 A | 9/2014 |
| JP | 2014-167296 A | 9/2014 |

* cited by examiner

ENGINE

BACKGROUND OF THE INVENTION

Field of the Invention

The present invention relates to an engine comprising: a crankcase; a cylinder block that is joined to the crankcase and that guides a linear reciprocal movement of a piston; a cylinder head that is joined to the cylinder block so as to define a combustion chamber between the cylinder head and the piston, the cylinder head being provided with an intake port communicating with the combustion chamber; and a throttle body that is joined to the intake port and that makes a butterfly valve within an intake path actuate based on driving force of an electric actuator so as to adjust an opening degree of the intake path.

Description of the Related Art

In Japanese Patent Application Laid-open No. 2014-159775, there is disclosure on a throttle body which is joined to an intake port of a cylinder head and which adjusts an opening degree of an intake path by actuating a butterfly valve provided within the intake path based on the driving force of an electric actuator. The electric actuator is supported behind the throttle body with two stays sandwiching the actuator with respect to the vehicle width direction. The stays extend to the rear from the throttle body and are connected to the electric actuator at their tip ends. In other words, the electric actuator is cantilever-supported on the tip ends of the stays.

There are cases where influence of vehicle vibrations on the throttle body and the actuator might be intensified according to the method by which the throttle body is connected to an insulator and the shape of the actuator, in some cases, requiring that such countermeasures as enhancing the strength of the connection portion be further taken.

SUMMARY OF THE INVENTION

The present invention has been accomplished in light of the above circumstances, and it is an object thereof to provide an engine allowing the influence of vehicle vibrations on such throttle body and actuator to be alleviated by enhancing the rigidity with which to support such throttle body and actuator in a simple structure.

In order to achieve the object, according to a first aspect of the present invention, there is provided an engine comprising: a crankcase; a cylinder block that is joined to the crankcase and that guides a linear reciprocal movement of a piston; a cylinder head that is joined to the cylinder block so as to define a combustion chamber between the cylinder head and the piston, the cylinder head being provided with an intake port communicating with the combustion chamber; and a throttle body that is joined to the intake port and that makes a butterfly valve within an intake path actuate based on driving force of an electric actuator so as to adjust an opening degree of the intake path, wherein the engine further comprises: a receptor that extends from the throttle body to a direction distant from the throttle body above the crankcase and that receives the electric actuator therein; and a supporting piece that extends from the receptor to the direction distant from the throttle body and that is supported on the crankcase.

With the first aspect of the present invention, the electric actuator heavy in weight is supported at both ends by the throttle body and the crankcase, enhancing the rigidity with which the actuator is supported against vehicle vibrations and allowing the influence of vehicle vibrations on the throttle body and the actuator to be alleviated.

According to a second aspect of the present invention, in addition to the first aspect, the supporting piece is secured to the crankcase through an elastic body.

With the second aspect of the present invention, the elastic member intervene between the supporting piece and the crankcase, allowing the influence of vibrations caused by the crankcase on the electric actuator to be alleviated.

According to a third aspect of the present invention, in addition to the first aspect, the crankcase is provided with: a crankcase main body that is joined to the cylinder block so as to define a crank room; and a breather cover that is joined to the crankcase main body from above at a rear of the cylinder block so as to define a breather room for performing gas-liquid separation of a blow-by gas, and the supporting piece is fastened to the breather cover.

With the third aspect of the present invention, the breather cover can be machined more easily than the crankcase main body, thus, forming the support structure of the supporting piece on the breather cover allows the electric actuator to be firmly supported with ease while avoiding the number of components from increasing.

According to a fourth aspect of the present invention, in addition to the first aspect, there is provided the engine, further comprising a crank shaft that is housed in the crankcase and provided with a crank connected to the piston, wherein an axis of a fastening member with which to fasten the supporting piece to the crankcase crosses an imaginary cylindrical face that circumscribes the crank, the imaginary cylindrical face being coaxial with a rotary axis of the crank shaft.

With the fourth aspect of the present invention, making the axis of the fastening member face to the crankshaft from which engine vibrations derive contributes to taking countermeasures against vibrations.

According to a fifth aspect of the present invention, in addition to the first aspect, a fixing piece is formed on the throttle body, the fixing piece extending to a direction opposite to the receptor and distant from the throttle body and being secured to the cylinder head.

With the fifth aspect of the present invention, the throttle body is secured with the supporting piece of the receptor and the fixing piece at its both sides, allowing the throttle body and the electric actuator to be supported in a more stable manner.

According to a sixth aspect of the present invention, in addition to the fifth aspect, a diametrically enlarged portion and a receiving portion are formed on an upstream end of the intake port, the diametrically enlarged portion enlarging in diameter to a direction orthogonal to an intake air direction, the receiving portion extending to a direction distant from the combustion chamber so as to surround a downstream end of the throttle body joined to the diametrically enlarged portion, an annular elastic member is inserted into the receiving portion, and the downstream end of the throttle body is fitted into the receiving portion through the annular elastic member.

With the sixth aspect of the present invention, even without separately providing any means for connecting the downstream end of the throttle body with the upstream end of the intake port, the throttle body is secured to the cylinder head and the crankcase, thereby allowing the downstream end of the throttle body to be secured to the upstream end of the intake port with sufficient strength.

The above and other objects, characteristics and advantages of the present invention will be clear from detailed descriptions of the preferred embodiment which will be provided below while referring to the attached drawings.

DESCRIPTION OF THE PREFERRED EMBODIMENT

Hereafter, one embodiment of the present invention is explained with reference to the accompanying drawings. In this regard, directions of up, down, front, rear, left, and right of a vehicle body are defined based on the eyes' directions of an occupant who rides on a two-wheeled motor vehicle.

Figure 1:
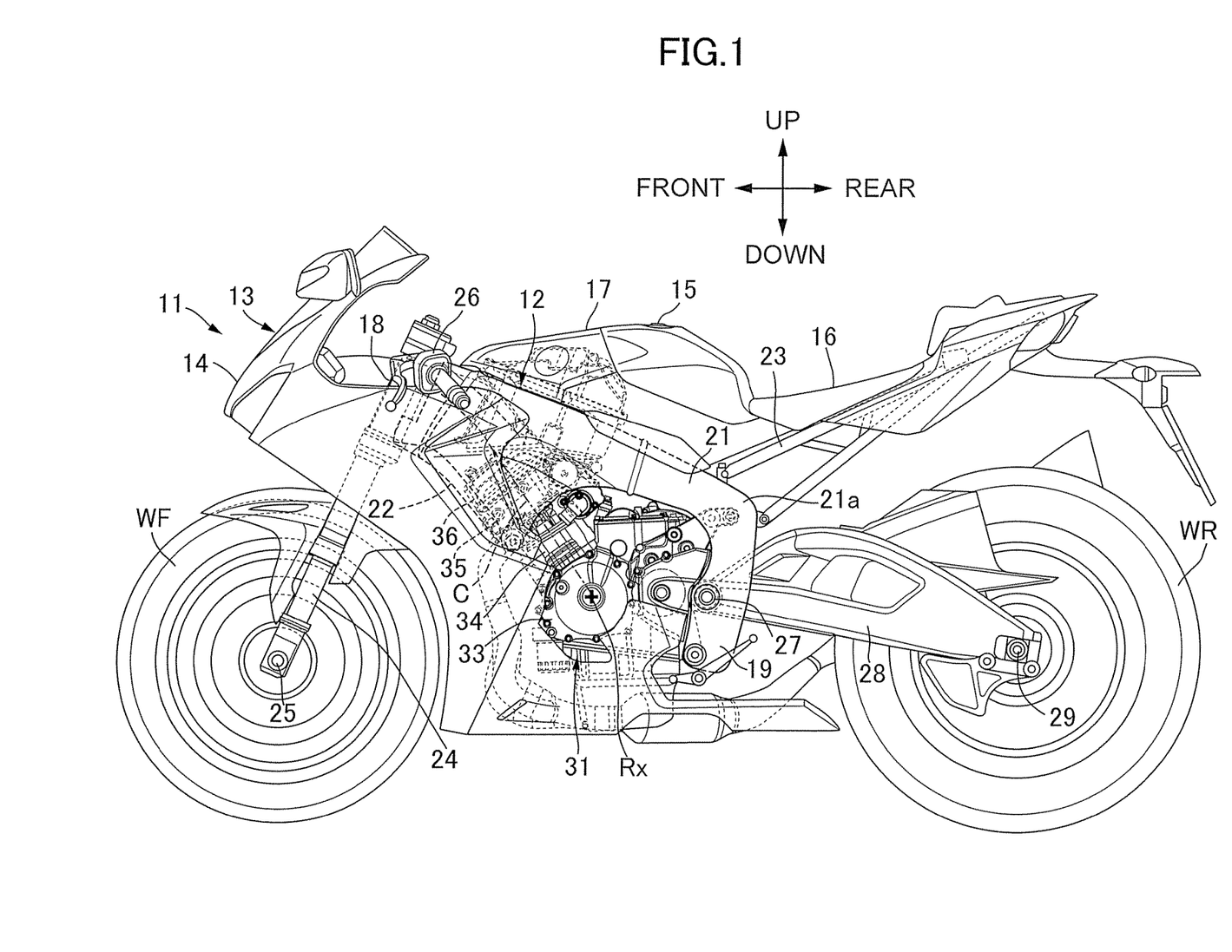
FIG. 1 is a side view schematically illustrating the entire structural arrangement of a two-wheeled motor vehicle according to one embodiment of the present invention.

FIG. 1 schematically illustrates the entire image of a two-wheeled motor vehicle 11 which is a straddle-ridden vehicle according to one embodiment of the present invention. The two-wheeled motor vehicle 11 is provided with a vehicle body frame 12 and a vehicle body cover 13 mounted on the vehicle body frame 12. The vehicle body cover 13 has a front cowl 14 to cover the vehicle body frame 12 from the front and a tank cover 17 which continues forwards from an outer side of a fuel tank 15 and is connected to an occupant seat 16 at the rear of the fuel tank 15. Fuel is stored in the fuel tank 15. The occupant straddles the occupant seat 16 for driving the two-wheeled motor vehicle 11.

The vehicle body frame 12 has: a head pipe 18; a pair of left and right main frames 21 which extends rearwardly and downwardly from the head pipe 18 and which is provided with a pivot frame 19 at its rear lower end; a down frame 22 which extends downwardly from the head pipe 18 at the lower positions of the main frames 21 and is integrated with the main frames 21; and a pair of left and right seat frames 23 which extends rearwardly and upwardly from curved zones 21a of the main frames 21 and constitutes a truss structure. The occupant seat 16 is supported on the seat frames 23.

Front forks 24 are steerably supported on the head pipe 18. A front wheel WF is rotatably supported around an axle 25 on the front forks 24. A steering handlebar 26 is connected to an upper end of the front forks 24. A rider holds grips at the left and right ends of the steering handlebar 26 for driving the two-wheeled motor vehicle 11.

A swing arm 28 is connected to the vehicle body frame 12 at the vehicle rear so as to be swingable in the up-down direction around a pivot 27. A rear wheel WR is rotatably supported around an axle 29 at the rear ends of the swing arm 28. An engine 31 to generate power to be transmitted to the rear wheel WR is mounted on the vehicle body frame 12 between the front wheel WF and the rear wheel WR. The engine 31 is connected and supported to the down frame 22 and the main frames 21. The power generated by the engine 31 is transmitted through a transmission apparatus to the rear wheel WR.

Figure 2:
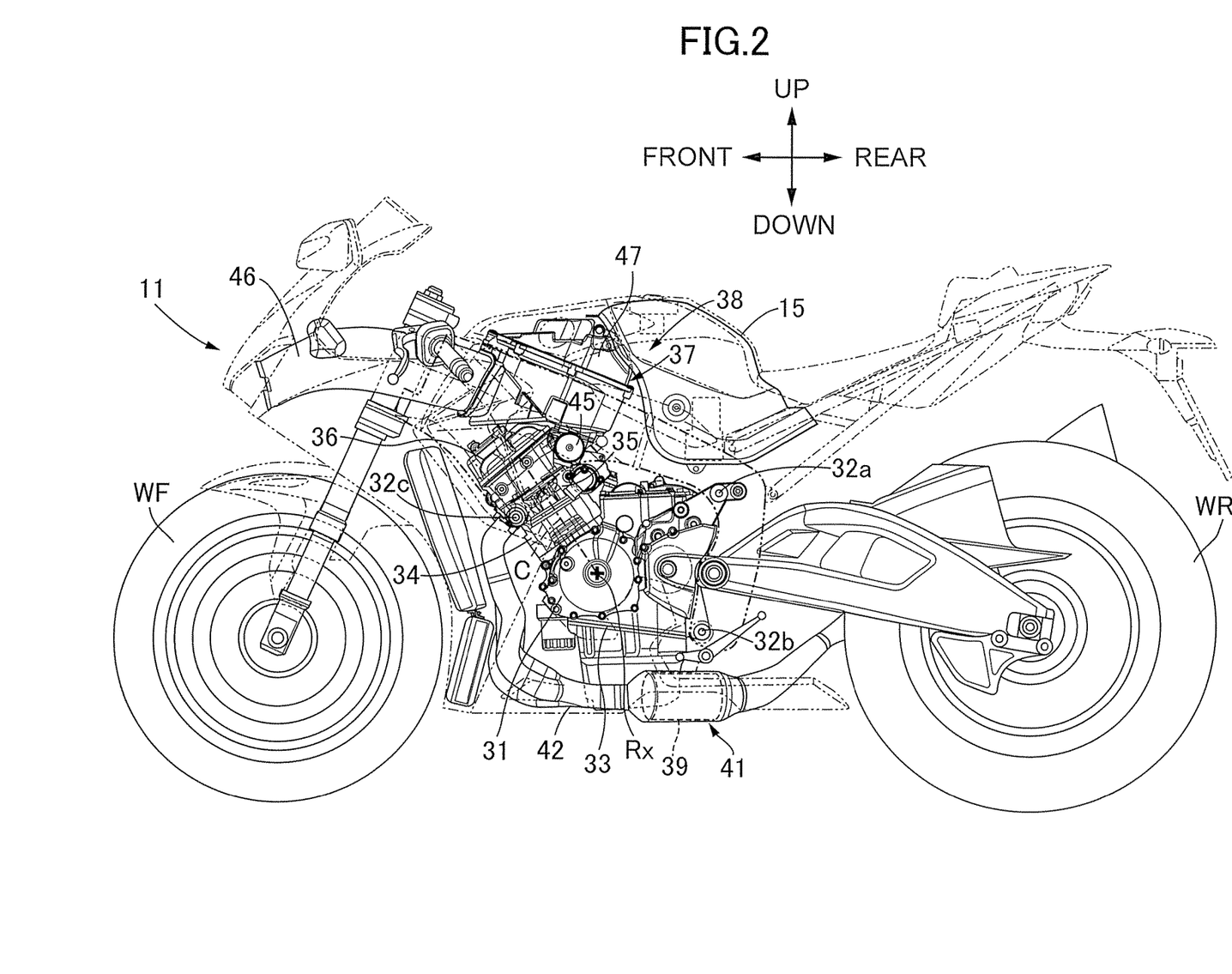
FIG. 2 is a side view schematically illustrating the entire structural arrangement of the two-wheeled motor vehicle with the exclusion of a vehicle body cover.

As illustrated in FIG. 2, the main body of the engine 31 has: a crankcase 33 which is provided with engine hangers 32a and 32b connected to the main frames 21 at the upper and lower ends of its rear wall and outputs power around a rotary axis Rx; a cylinder block 34 which is joined to the frontal part of the crankcase 33 from the above and is provided with a cylinder axis C which is located within the perpendicular plane orthogonal to the rotary axis Rx and is upright with respect to the horizontal plane; a cylinder head 35 joined to the upper end of the cylinder block 34 and provided at its frontal wall with an engine hanger 32c connected to the down frame 22, the cylinder head 35 supporting a valve train; and a head cover 36 which is joined to the upper end of the cylinder head 35 and covers the valve train arranged above the cylinder head 35. In this embodiment, four cylinders are disposed in series in the cylinder block 34 in the vehicle width direction defined by the rotary axis Rx in parallel with the axle 29.

An intake apparatus 38 and an exhaust apparatus 41 are connected to the cylinder head 35. The intake apparatus 38 generates an air-fuel mixture by spraying fuel to the air purified by an air cleaner 37 and supplies such air-fuel mixture to a combustion chamber covered with the cylinder head 35. The exhaust apparatus 41 purifies the combusted exhaust gas discharged from the combustion chamber with a catalyst 39 and emits such purified exhaust gas to the vehicle rear with the temperature of such gas being reduced. The exhaust apparatus 41 runs below the crankcase 33 so as to extend along the lateral side of the rear wheel WR and is provided with an exhaust pipe 42 to support the catalyst 39 below the crankcase 33.

The air cleaner 37 is joined to a throttle body 45 and is provided with an air cleaner box 47 to intake travelling air from an air duct 46 which opens at the front of the head pipe 18. The air cleaner 37 intakes and the travelling air into the air cleaner box 47 for purification and feeds the purified air into the engine 31. The air cleaner box 47 is covered with the fuel tank 15 from the rear.

Figure 3:
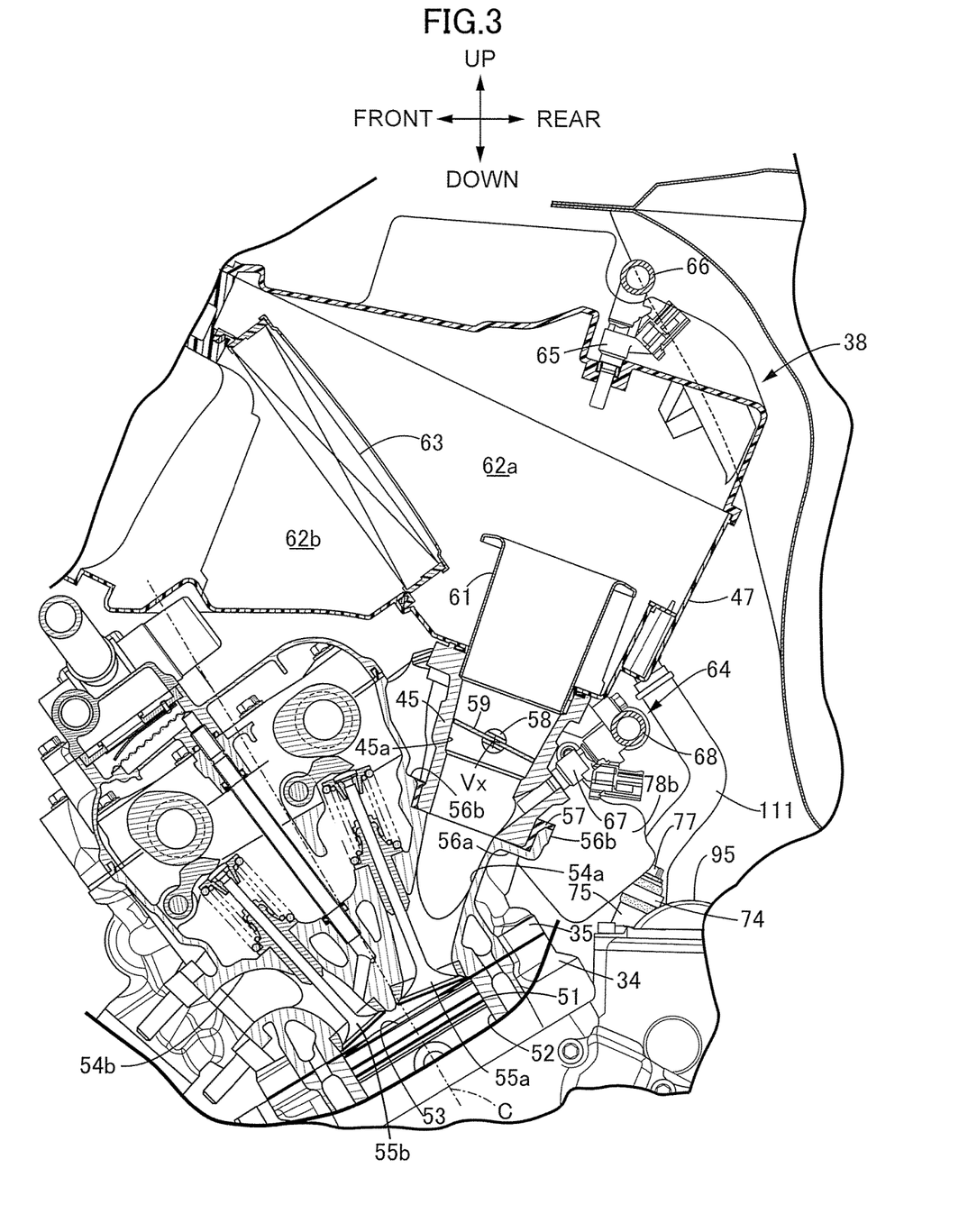
FIG. 3 corresponds to a vertical sectional view taken along 3-3 line depicted in FIG. 4, and schematically illustrates the structural arrangement of an engine and an air cleaner box respectively.

As illustrated in FIG. 3, a cylinder 52 to guide the linear reciprocal movement of a piston 51 along the cylinder axis C is defined in the cylinder block 34. The combustion chamber 53 is formed between the piston 51 and the cylinder head 35. A pair of intake ports 54a (only one port illustrated) and a pair of exhaust ports 54b (only one port illustrated) which open through the ceiling of the combustion chamber 53 are connected to the combustion chamber 53. An intake valve 55a which opens/closes the opening of the respective intake ports 54a and an exhaust valve 55b which opens/closes the opening of the respective exhaust ports 54b are supported on the cylinder head 35 such that such valves are displaceable in an axial direction.

The throttle body 45 is joined to the cylinder head 35. One intake path 45a for each cylinder 52 is defined in the throttle body 54. The respective intake paths 45a are connected to the two intake ports Ma for each cylinder 52. A diametrically enlarged portion 56a and an annular receiving portion 56b are formed on the upstream end of the intake port 54a. The diametrically enlarged portion 56a (whose diameter) enlarges to the direction orthogonal to the intake air direction and receives the downstream end of the throttle body 45 around the respective intake paths 45a. The receiving portion 56b is integrally formed with the outer periphery of the diametrically enlarged portion 56a and extends to the direction distant from the combustion chamber 53 such that it surrounds the downstream end of the throttle body 45 joined to the diametrically enlarged portion 56a. An annular elastic member 57 is inserted into the receiving portion 56b. The downstream end of the throttle body 45 is fitted into the receiving portion 56b through the annular elastic member 57. The annular elastic member 57 is molded from e.g. a rubber or a resinous material having flexibility.

A valve shaft 58 is rotatably supported around the rotary axis Vx on the throttle body 45. A butterfly valve 59 (throttle valve) is secured to the valve shaft 58. The butterfly valve 59 adjusts an opening degree of the intake path 45a within the throttle body 45 according to the rotation around the rotary axis Vx.

A funnel 61 is joined to the throttle body 45 for each cylinder 52. The funnel 61 protrudes to a clean room 62a within the air cleaner box 47 by penetrating through a bottom wall of the air cleaner box 47 overlaid on the throttle body 45. The inner space of the air cleaner box 47 is divided, by an air cleaner element 63, into a dirty room 62b on the frontal side which is connected to an air duct 46 and introduces the travelling air from the air duct 46 and the clean room 62a on the rear side. The air within the dirty room 62b is filtered with the air cleaner element 63 so as to flow into the clean room 62a. The purified air flows into the intake port Ma of the cylinder head 35 through the intake path 45a within the throttle body 45 from the funnel 61.

The intake apparatus 38 is provided with a fuel supply device 64 which sprays fuel to the air purified by the air cleaner 37. The fuel supply device 64 has: an upper injector 65 incorporated in the upper wall of the air cleaner box 47 for each cylinder 52; a first fuel supply pipe 66 which linearly extends above the air cleaner box 47 in the vehicle width direction and supplies fuel to the respective upper injectors 65 from a branch pipe corresponding to the respective upper injectors 65; a main injector 67 incorporated in the throttle body 45 for each cylinder 52; and a second fuel supply pipe 68 which linearly extends in the vehicle width direction at the rear side of the throttle body 45 and supplies fuel to the respective main injectors 67 from a branch pipe corresponding to the respective main injectors 67.

The respective upper injectors 65 spray fuel downwardly towards the funnel 61. In the low rotation region of the engine 31, the fuel is sprayed from the main injectors 67 at the intake paths 45a within the throttle body 45. In the high rotation region of the engine 31, the fuel is sprayed from the upper injectors 65 within the clean room 62a, in which the air-fuel ratio is adjusted with the fuel sprayed from the main injectors 67.

Figure 4:
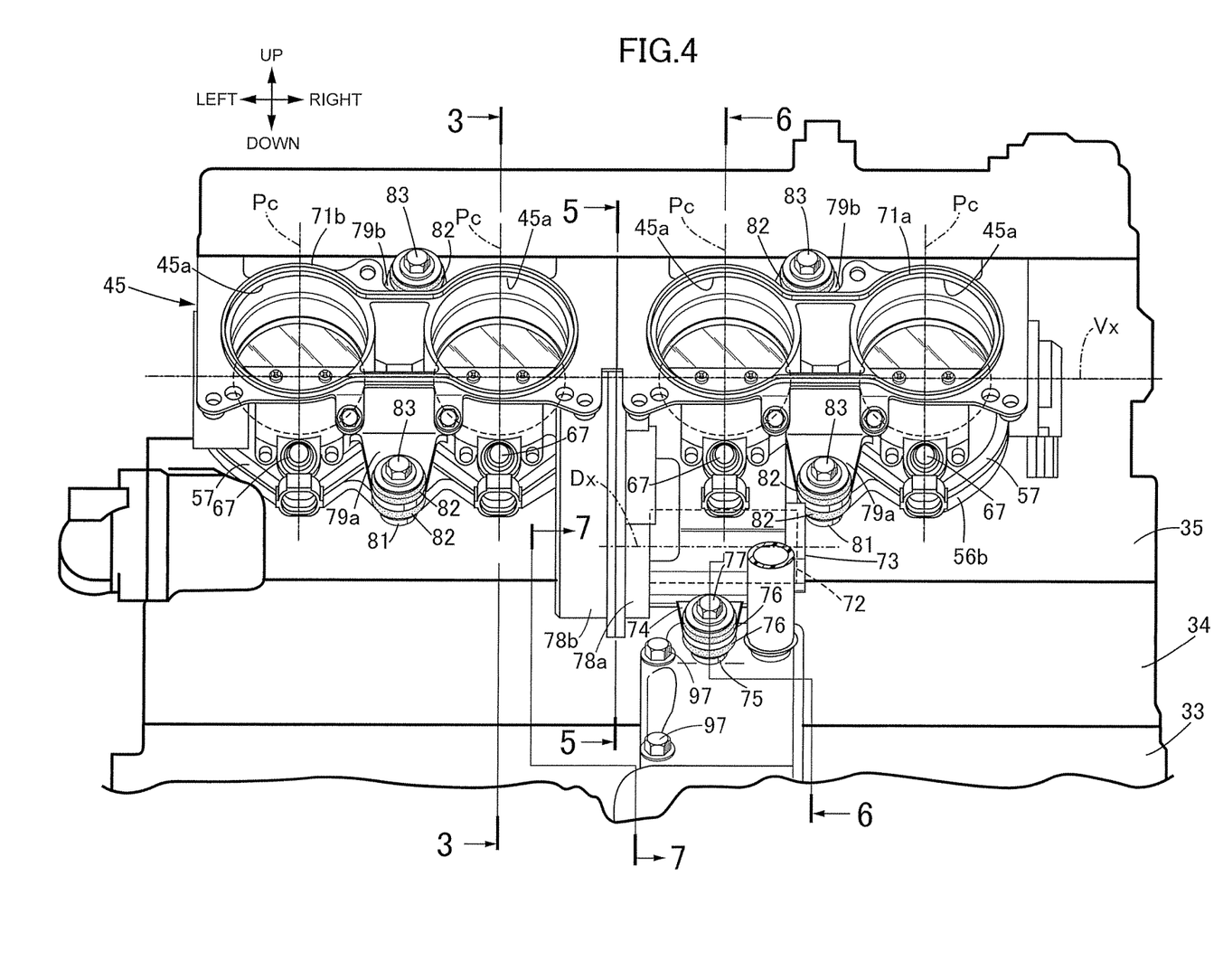
FIG. 4 is an enlarged top view of an engine which schematically illustrates the structure of a throttle body.

As illustrated in FIG. 4, the throttle body 45 is provided with a first half body 71a which defines two right-side intake paths 45a corresponding to two right-side cylinders 52 and a second half body 71b which is joined to the first half body 71a at a mating surface orthogonal to the rotary axis Vx of the valve shaft 58 and defines two left-side intake paths 45a corresponding to two left-side cylinders 52. A receptor 73 which extends (rearwardly) from the throttle body 45 above the crankcase 33 to the direction distant from the throttle body 45 and houses an electric motor (electric actuator) 72 therein and a supporting piece 74 which extends (rearwardly) from the receptor 73 to the direction distant from the throttle body 45 and is supported on the crankcase 33 are integrally formed with the first half body 71a at the rear side of the intake path 45a near the mating surface. The electric motor 72 generates power around an axis Dx in parallel with the rotary axis Vx.

A boss 75 is formed on the crankcase 33 correspondingly to the supporting piece 74. The supporting piece 74 which is sandwiched between elastic bodies 76 (as elastic members) is overlaid on the boss 75. The elastic body 76 may be made of e.g. a rubber body or a resinous molded body having flexibility. A bolt 77 (as fastening member) is screwed into the boss 75. The supporting piece 74 sandwiched between the elastic bodies 76 is interposed between the boss 75 and the head of the bolt 77. In this way, the supporting piece 74 is secured to the cylinder head 35.

A first case body 78a and a second case body 78b are disposed in the space between the two intake paths 45a in the middle. The first case body 78a is formed on the first half body 71a and continuing from the receptor 73. The second case body 78b is integrally formed with the second half body 71b, joined to the first case body 78a at the mating surface, and defines a housing space between the second case body 78b and the first case body 78a, the housing space housing a decelerating mechanism intervening between the electric motor 72 and the valve shaft 58. A first fixing piece 79a and a second fixing piece 79b (as fixing piece) are integrally formed with each of the first case body 78a and the second case body 78b. The first fixing piece 79a extends (rearwardly) to the direction distant from the throttle body 45 and to the same direction as the receptor 73 and is secured on the cylinder head 35. The second fixing piece 79b extends (forwardly) to an opposite direction to the receptor 73 and distant from the throttle body 45 and is secured on the cylinder head 35. In each of the first half body 71a and the second half body 71b, the first fixing piece 79a and the second fixing piece 79b are disposed in a space interposed by imaginary planes Pc which are orthogonal to the rotary axis Vx and include centers of the two intake paths 45a respectively.

A boss 81 is integrally formed with the cylinder head 35 correspondingly to the respective first fixing pieces 79a. The first fixing piece 79a which is sandwiched between elastic bodies 82 is overlaid on the boss 81. A bolt 83 is screwed into the respective bosses 81. The first fixing piece 79a sandwiched between the elastic bodies 82 is interposed between the boss 81 and the head of the bolt 83. In this way, the respective first fixing pieces 79a are secured to the cylinder head 35. Likewise, a boss (not illustrated) is integrally formed with the cylinder head 35 correspondingly to the respective second fixing pieces 79b. The second fixing piece 79b which is sandwiched between elastic bodies 82 is overlaid on the boss in the same way as the first fixing piece 79a. A bolt 83 is screwed into the respective bosses. The second fixing piece 79b sandwiched between the elastic bodies 82 is interposed between the boss and the head of the bolt 83. In this way, the respective second fixing pieces 79b are secured to the cylinder head 35. The elastic body 82 may be made of e.g. a rubber body or a resinous molded body having flexibility.

Figure 5:
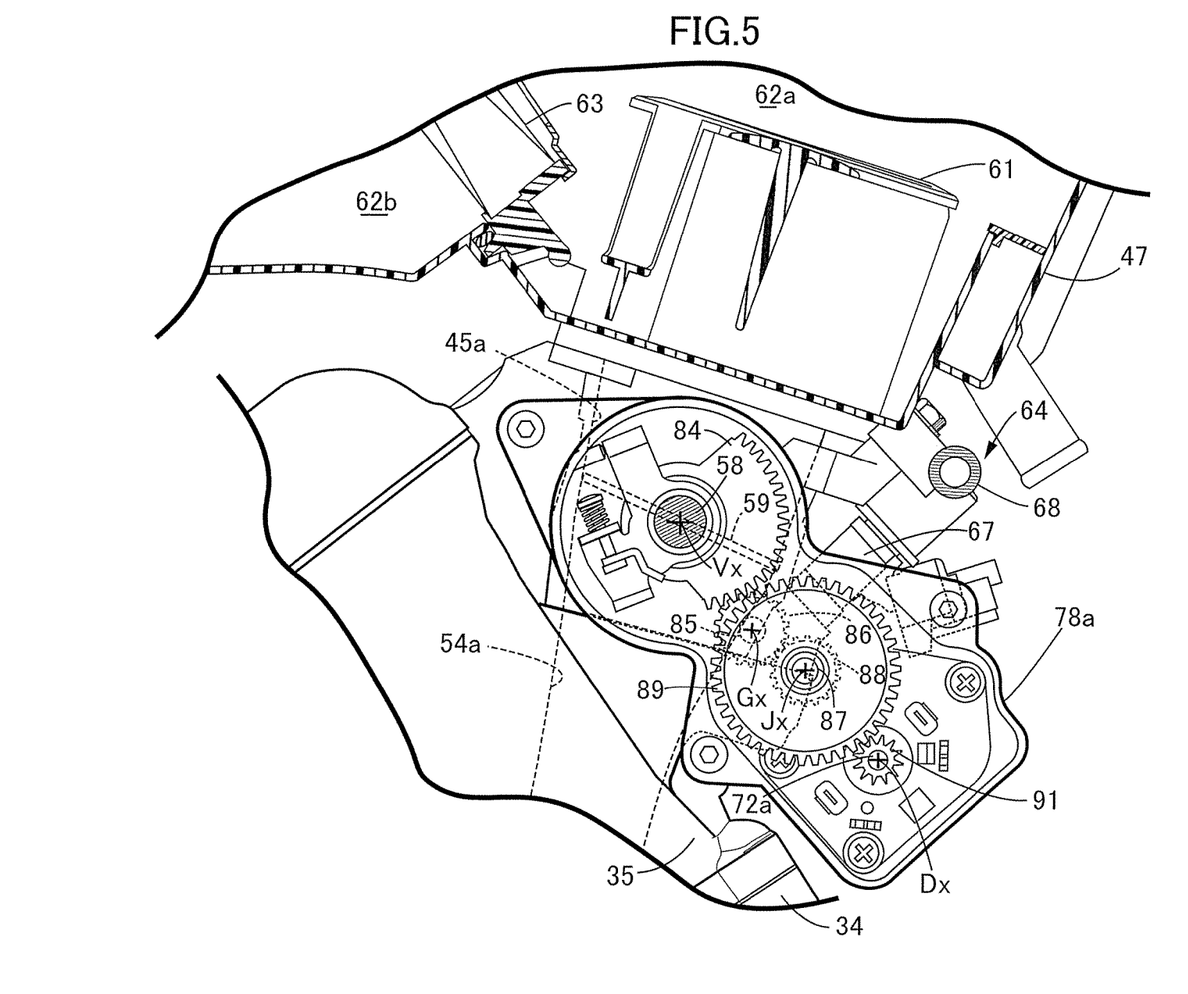
FIG. 5 is an enlarged side view schematically illustrating the structural arrangement of a decelerating mechanism intervening between a valve shaft of a butterfly valve and a driving motor.

As illustrated in FIG. 5, the decelerating mechanism of the electric motor 72 is provided with: a sector gear 84 secured to the valve shaft 58; a first gear 86 which is attached to a first shaft 85 having an axis Gx in parallel with the rotary axis Vx of the valve shaft 58 and meshes with the sector gear 84; a second gear 88 which is attached to a second shaft 87 having an axis Jx in parallel with the rotary axis Vx of the valve shaft 58 and meshes with the first gear 86; a third gear 89 which is coaxially integrated with the second gear 88 and has a diameter larger than that of the second gear 88; and a driving gear 91 which is secured to a driving shaft 72a of the electric motor 72 and meshes with the third gear 89. Upon the driving shaft 72a of the electric motor 72 rotating, the revolving force of the driving shaft 72a is transmitted from the driving gear 91 to the third gear 89. On account that the third gear 89 is integrated with the second gear 88, the revolving force of the third gear 89 causes the second gear 88 to rotate around the axis Jx of the second shaft 87. The second gear 88 rotates around the axis Jx of the second shaft 87 so as to transmit driving force to the first gear 86. In this way, the driving force for the first gear 86 is transmitted from the electric motor 72. The first gear 86 rotates around the axis Gx of the first shaft 85 so as to make the sector gear 84 rotate for driving the valve shaft 58.

Figure 6:
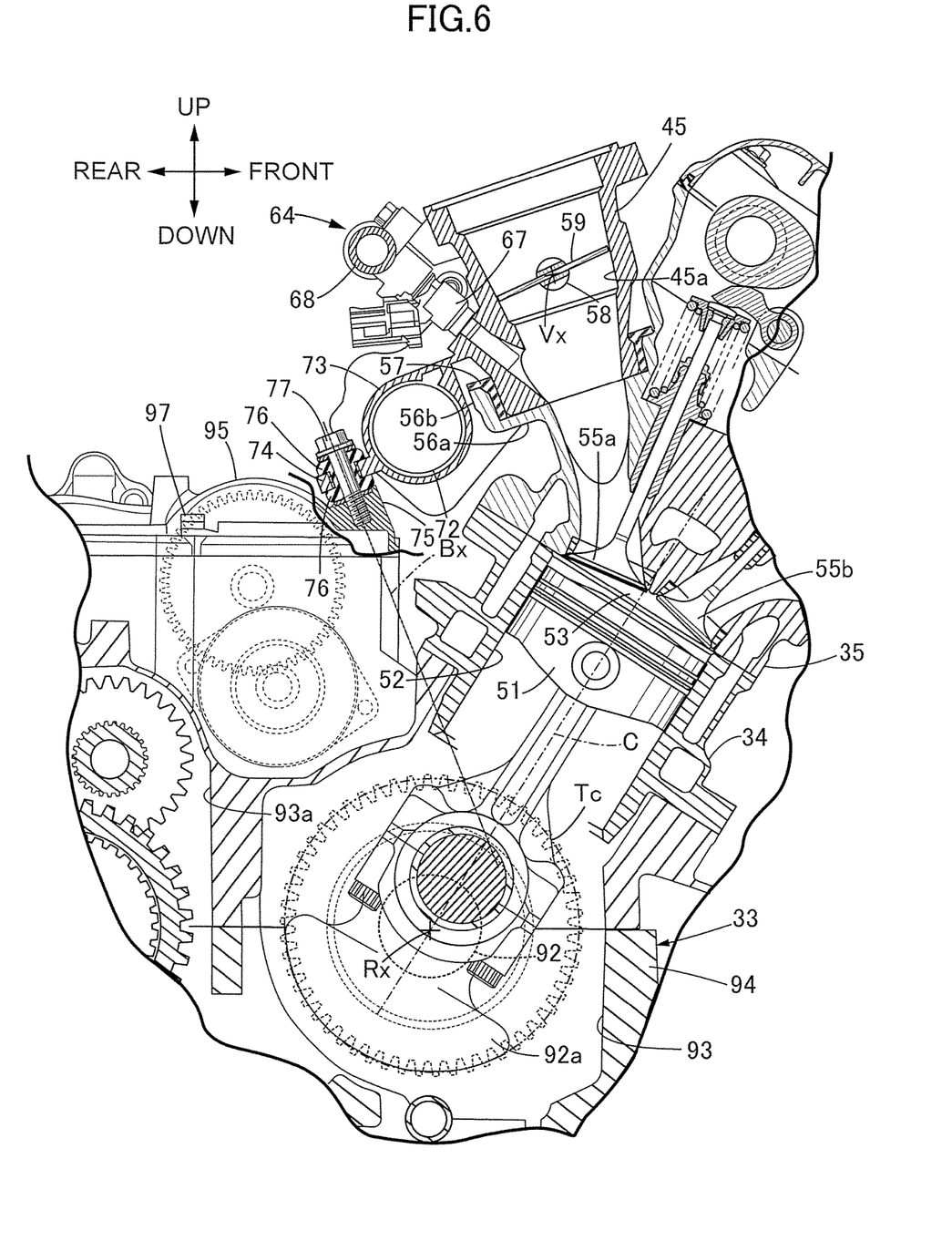
FIG. 6 is a view which corresponds to an enlarged vertical sectional view taken along 6-6 line depicted in FIG. 4 and schematically illustrates the structural arrangement of a crankcase.

As illustrated in FIG. 6, the crankcase 33 has a crankcase main body 94 which defines a crank room 93 housing therein a crank 92a of a crank shaft 92 and a breather cover 95 which is joined to the crankcase main body 94 from the above at the rear of the cylinder block 34 and defines a breather room to perform gas-liquid separation of the blow-by gas. The crankcase main body 94 is divided into upper and lower bodies on the plane including the rotary axis Rx of the crank shaft 92. The crank room 93 includes a transmission room 93a which houses a multistage transmission interconnected between the crank shaft 92 and an output shaft (not illustrated).

The supporting piece 74 extending rearwards from the receptor 73 is fastened to the breather cover 95. A boss 75 which receives the supporting piece 74 is formed on the breather cover 95. The elastic bodies 76 continuously enclose the shaft portion of the bolt 77 to be integrated with each other. The breather cover 95 may be fastened to the crankcase main body 94 with e.g. a plurality of bolts 97. The axis Bx of the bolt 77 to fasten the supporting piece 74 to the crankcase 33 crosses an imaginary cylindrical face Tc which circumscribes the crank 92a, the imaginary cylindrical face Tc being coaxial with the rotary axis Rx of the crank shaft 92. To note, in the same way as the elastic bodies 76, the elastic bodies 82 continuously enclose the shaft portion of the bolt 83 to be integrated with each other.

Figure 7:
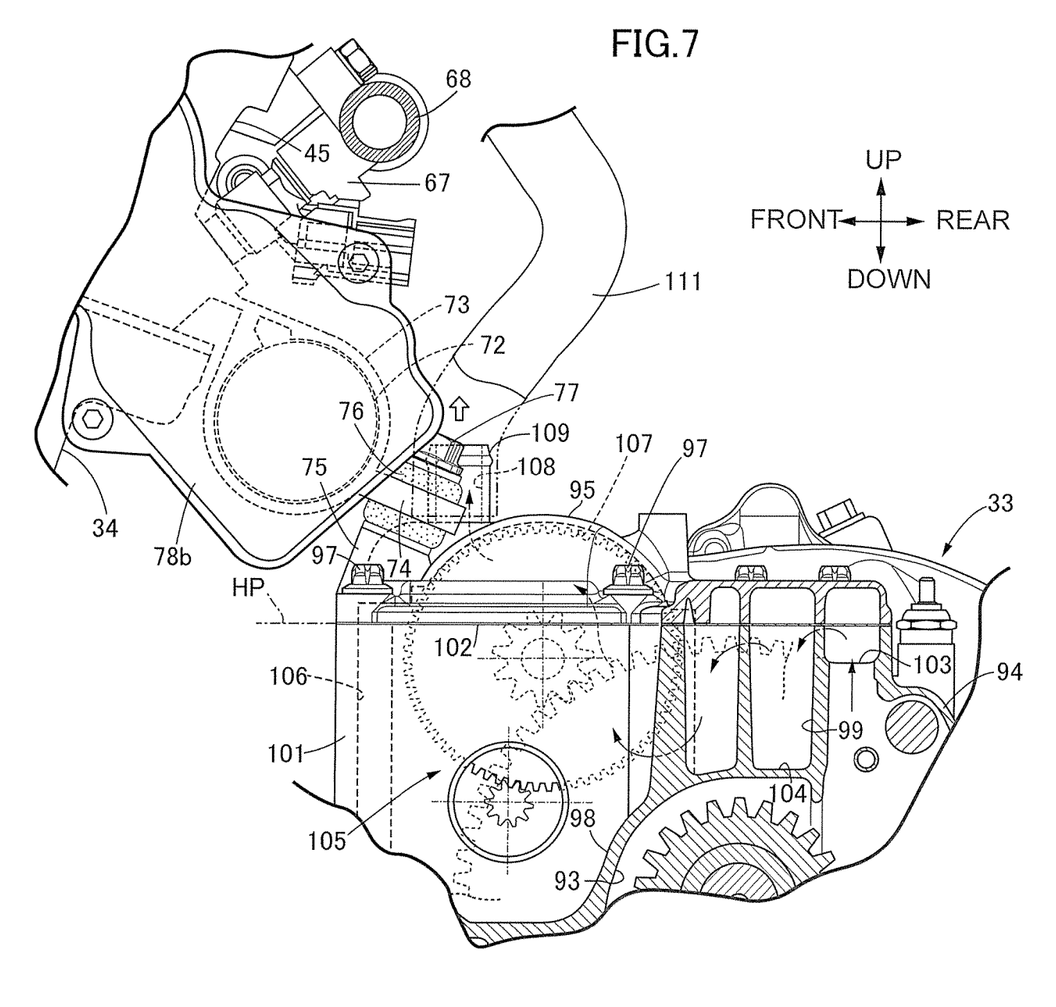
FIG. 7 is a view which corresponds to an enlarged vertical sectional view taken along 7-7 line depicted in FIG. 4 and schematically illustrates the structure of a breather room.

As illustrated in FIG. 7, the crankcase 33 is formed with a wall body 101 which stands upright from the outer surface of an upper wall 98, which is provided with an upper end partitioned with a horizontal plane HP, and which encloses the breather room 99. The wall body 101 is formed above the upper wall 98 partitioning the crank room 93. The breather cover 95 is partitioned from the crankcase main body 94 at the horizontal plane HP in parallel with the rotary axis Rx. A gasket 102 is interposed between the crankcase main body 94 and the breather cover 95.

The gasket 102 defines, between the gasket 102 and the upper wall 98 of the crank room 93, a labyrinth passage 104 extending from an inlet opening 103 which opens to the crank room 93. The labyrinth passage 104 is connected to a gear room 106 which is defined between the upper wall 98 of the crank room 93 and the breather cover 95 and houses a decelerating mechanism 105 of a starter motor. The gear room 106 is connected to an exit room 107 which is defined between the breather cover 95 and the gasket 102. A pipe body 109 which defines an outlet end 108 communicating with the outlet room 107 is formed on the breather cover 95.

As illustrated in FIG. 3, a breather hose 111 extending from the clean room 62a of the air cleaner box 47 is joined to the pipe body 109.

Then, the operation of an internal combustion engine according to the present embodiment is explained. Upon an accelerator being operated, the butterfly valves 59 rotate according to an operation amount. The opening degrees of the intake paths 45a (intake passages) are set according to the rotation of the butterfly valves 59. The air within the clean rooms 62a flows into the intake paths 45a and the intakes ports 54a through the funnels 61. The air-fuel mixture flows into the combustion chambers 53 according to the opening/closing operation of the intake valves 55a. The linear reciprocal movements of the pistons 51 are realized according to the combustion state of the air-fuel mixture within the combustion chamber 53.

The operation amount of the accelerator is detected upon the butterfly valve 59 rotating. The detection signal to specify the operation amount is supplied to an ECU (Electronic Control Unit). The ECU specifies the rotation amount of the butterfly valve 59 according to the prescribed correspondence relation. The control signal to specify the rotation amount is supplied to the electric motor 72. The electric motor 72 makes the driving shaft 72a rotate according to the rotation amount designated by the control signal. The rotation of the driving shaft 72a is transmitted from the driving gear 91 to the third gear 89. The rotation of the third gear 89 causes the second gear 88 to rotate around the axis Jx of the second shaft 87. The second gear 88 rotates around the axis Jx of the second shaft 87 so as to transmit the driving force to the first gear 86. In this way, the driving force for the first gear 86 is transmitted from the electric motor 72. The first gear 86 rotates around the axis Gx of the first shaft 85 so as to make the sector gear 84 rotate for driving the valve shaft 58.

In the engine 31 according to the present embodiment, the receptor 73 which houses therein the electric motor 72 extends rearwardly from the throttle body 45 above the crankcase 33 and is supported on the crankcase 33 with the supporting piece 74 which extends rearwardly from the receptor 73. The electric motor 72 heavy in weight is supported at both ends by the throttle body 45 and the crankcase 33. As a result, the rigidity with which to support the electric motor 72 against vehicle vibrations is enhanced. The influence of vehicle vibrations on the throttle body 45 and the electric motor 72 is alleviated. The precision with which to control the electric motor 72 is enhanced.

In this regard, the supporting piece 74 of the receptor 73 is secured to the crankcase 33 through elastic bodies 76. The intervention of such elastic bodies 76 between the supporting piece 74 and the crankcase 33 allows the influence of the vibrations of the crankcase 33 on the electric motor 72 to be alleviated.

According to the present embodiment, the crankcase 33 has the crankcase main body 94 which defines a crank room 93 housing therein a crank 92a of the crank shaft 92 and a breather cover 95 which is joined to the crankcase main body 94 from the above at the rear of the cylinder block 34 and defines the breather room 99 to perform the gas-liquid separation of the blow-by gas. Then, the supporting piece 74 is fastened to the breather cover 95 of the crankcase 33. The breather cover 95 can be machined more easily than the crankcase main body 94, thus, forming the support structure of the supporting piece 74 on the breather cover 95 allows the electric actuator 72 to be firmly supported with ease while avoiding the number of components from increasing.

In the engine 31 according to the present embodiment, the axis Bx of the bolt 77 to fasten the supporting piece 74 to the crankcase 33 crosses an imaginary cylindrical face Tc which circumscribes the crank 92a, the imaginary cylindrical face Tc being coaxial with the rotary axis Rx of the crank shaft 92. Making the axis Bx of the bolt 77 face to the crankshaft 92 from which vibrations of the engine 31 derive contributes to taking countermeasures against vibrations.

The second fixing piece 79b is formed on the throttle body 45, extends (forwardly) to an opposite direction to the receptor 73 and distant from the throttle body 45, and is secured on the cylinder head 35. The throttle body 45 is secured with the supporting piece 74 of the receptor 73 and the second fixing piece 79b at its both sides, allowing the throttle body 45 and the electric motor 72 to be supported in a more stable manner.

In the cylinder head 35 according to the present embodiment, the diametrically enlarged portion 56a and the receiving portion 56b are formed on the upstream end of the intake port 54a. The diametrically enlarged portion 56a enlarges in diameter to the direction orthogonal to the intake air direction. The receiving portion 56b extends to the direction distant from the combustion chamber 53 such that it surrounds the downstream end of the throttle body 45 joined to the diametrically enlarged portion 56a. The annular elastic member 57 is inserted into the receiving portion 56b. The downstream end of the throttle body 45 is fitted into the receiving portion 56b through the annular elastic member 57. Even without separately providing any means for connecting the downstream end of the throttle body 45 with the upstream end of the intake port 54a, the throttle body 45 is secured to the cylinder head 35 and the crankcase 33, thereby allowing the downstream end of the throttle body 45 to be secured to the upstream end of the intake port 54a with sufficient strength.

What is claimed is:

1. An engine comprising:
    a crankcase;
    a cylinder block that is joined to the crankcase and that guides a linear reciprocal movement of a piston;
    a cylinder head that is joined to the cylinder block so as to define a combustion chamber between the cylinder head and the piston, the cylinder head being provided with an intake port communicating with the combustion chamber; and
    a throttle body that is joined to the intake port and that makes a butterfly valve within an intake path actuate based on driving force of an electric actuator so as to adjust an opening degree of the intake path,
    wherein the engine further comprises:
        a receptor that extends from the throttle body to a direction distant from the throttle body above the crankcase and that receives the electric actuator therein; and
        a supporting piece that extends from the receptor to the direction distant from the throttle body and that is fastened directly to the crankcase;
        wherein the throttle body, receptor, and supporting piece are integrally formed as a continuous material.

2. The engine according to claim 1, wherein the supporting piece is secured to the crankcase through an elastic body.

3. The engine according to claim 1, wherein
    the crankcase is provided with: a crankcase main body that is joined to the cylinder block so as to define a crank room; and a breather cover that is joined to the crankcase main body from above at a rear of the cylinder block so as to define a breather room for performing gas-liquid separation of a blow-by gas, and
    the supporting piece is fastened to the breather cover.

4. The engine according to claim 1, further comprising a crank shaft that is housed in the crankcase and provided with a crank connected to the piston,
    wherein an axis of a fastening member with which to fasten the supporting piece to the crankcase crosses an imaginary cylindrical face that circumscribes the crank, the imaginary cylindrical face being coaxial with a rotary axis of the crank shaft.

5. The engine according to claim 1, wherein a fixing piece is formed on the throttle body, the fixing piece extending to a direction opposite to the receptor and distant from the throttle body and being secured to the cylinder head.

6. The engine according to claim 5, wherein
    a diametrically enlarged portion and a receiving portion are formed on an upstream end of the intake port, the diametrically enlarged portion enlarging in diameter to a direction orthogonal to an intake air direction, the receiving portion extending to a direction distant from the combustion chamber so as to surround a downstream end of the throttle body joined to the diametrically enlarged portion,
    an annular elastic member is inserted into the receiving portion, and
    the downstream end of the throttle body is fitted into the receiving portion through the annular elastic member.

* * * * *